United States Patent
Klepp et al.

(10) Patent No.: US 7,578,091 B2
(45) Date of Patent: Aug. 25, 2009

(54) OPERATING ELEMENT FOR A TELESCOPIC SIGHT

(75) Inventors: Christian Klepp, Weikersdorf (AT); Hermann Theisinger, Wein (AT); Roman Wagensommerer, Wein (AT)

(73) Assignee: Kahles Ges, M.B.H., Vienna (AT)

( * ) Notice: Subject to any disclaimer, the term of this patent is extended or adjusted under 35 U.S.C. 154(b) by 187 days.

(21) Appl. No.: 11/597,985

(22) PCT Filed: Jul. 18, 2005

(86) PCT No.: PCT/AT2005/000279

§ 371 (c)(1),
(2), (4) Date: Nov. 30, 2006

(87) PCT Pub. No.: WO2006/017869

PCT Pub. Date: Feb. 23, 2006

(65) Prior Publication Data

US 2008/0066364 A1    Mar. 20, 2008

(30) Foreign Application Priority Data

Aug. 18, 2004  (AT) .............................. A 1392/2004

(51) Int. Cl.
*F41G 1/38* (2006.01)
*F41G 1/00* (2006.01)
(52) U.S. Cl. .............................. 42/122; 42/111; 42/119; 42/130; 89/41.19
(58) Field of Classification Search ................... 42/111, 42/119, 122, 130; 89/41.19
See application file for complete search history.

(56) References Cited

U.S. PATENT DOCUMENTS 2,150,629 A    3/1939  Mossberg (Continued)

FOREIGN PATENT DOCUMENTS

CH                623414            5/1981

(Continued)

OTHER PUBLICATIONS

International Search Report dated Nov. 29, 2005, application No. PCT/AT2005/000279.

(Continued)

*Primary Examiner*—Bret Hayes
*Assistant Examiner*—Michael D David
(74) *Attorney, Agent, or Firm*—RatnerPrestia (57) ABSTRACT

The invention relates to an operating element for adjusting the cross-hairs of a telescopic sight. The operating element is in the form of a rotating knob, arranged to rotate on the telescopic sight, whereby a rotation of the rotating knob adjusts the cross-hairs by means of an adjuster mechanism. The rotating knob comprises one or several index marks, by means of which one or more positions of the cross-hairs may be indexed. The one or several index element(s) is/are arranged in one or several recess(es) and may be displaced therein in the circumferential direction of the rotating knob. The index elements are furthermore coupled to the rotating knob in the recesses such as to be rotated with the rotating knob on a rotation of the same. According to the invention, the outer surface(s) of the index element(s) are recessed relative to the outer surface of the rotating knob in the direction of the rotational axis of the rotating knob and the one or several index element(s) is/are arranged to be permanently displaceable in the recess(es).

8 Claims, 7 Drawing Sheets

U.S. PATENT DOCUMENTS

| | | | |
|---|---|---|---|
| 3,175,531 | A | 3/1965 | Du Bois |
| 3,280,463 | A | 10/1966 | Stadler |
| 3,990,155 | A | 11/1976 | Akin, Jr. et al. |
| 4,247,161 | A | 1/1981 | Unertl, Jr. et al. |
| 5,715,607 | A | 2/1998 | Murg et al. |
| 6,279,259 | B1 | 8/2001 | Otteman |
| 6,519,890 | B1 * | 2/2003 | Otteman ........................ 42/122 |
| 6,691,447 | B1 | 2/2004 | Otteman |
| 6,772,550 | B1 * | 8/2004 | Leatherwood ............... 42/119 |
| 7,415,791 | B2 * | 8/2008 | Williams et al. ............... 42/122 |
| 2003/0140545 | A1 * | 7/2003 | Huber ........................ 42/122 |
| 2004/0144013 | A1 | 7/2004 | Leatherwood |
| 2006/0168871 | A1 * | 8/2006 | Wagner ........................ 42/122 |
| 2007/0137089 | A1 * | 6/2007 | William et al. ................ 42/122 |

FOREIGN PATENT DOCUMENTS

| | | |
|---|---|---|
| DE | 2357544 | 5/1975 |
| DE | 20212546 | 12/2002 |

OTHER PUBLICATIONS

Austrian Patent Office Search Report (Date and End of Search, Aug. 2, 2005).

PCT Search Report (PCT/AT2005/000278 Int'l Filing Date Jul. 18, 2005) w/ translation of Written Opinion.

* cited by examiner

OPERATING ELEMENT FOR A TELESCOPIC SIGHT

CROSS-REFERENCE TO RELATED APPLICATION

This application is a U.S. National Stage application of PCT Application No. PCT/AT2005/000279, filed Jul. 18, 2005, which claims priority from Austrian Application No. A 1392/2004, filed on Aug. 18, 2004.

FIELD OF THE INVENTION

The invention relates to an actuator for adjusting the position of the lead mark of a telescopic sight, the actuator being in the form of a rotary knob mounted for rotation on the telescopic sight, rotation of said knob causing the lead mark to be adjusted by means of an adjusting mechanism in a vertical and/or horizontal direction while the turning range of the rotary knob is restricted by at least one operating range limit stop in both directions of rotation, wherein the rotary knob has one or more indexing elements by means of which one or more positions of the lead mark can be indexed, wherein in an actuating mode rotation of said rotary knob entrains the one or more indexing elements therewith and in an indexing mode the indexing elements can be displaced in the peripheral direction of said rotary knob independently of the rotary knob, and said rotary knob has one or more orifices on its lateral surface in the peripheral direction, and in at least one recess at least one indexing element is mounted for rotation in the peripheral direction, and wherein the one or more indexing elements is coupled to said rotary knob via its/their orifice in such a manner that when said rotary knob is turned it/they are entrained therewith.

BACKGROUND OF THE INVENTION

Telescopic sights have a lead mark, for example in the form of a reticle. In order to be able to adjust the lead mark to the actual point of impact for specific ballistics (caliber, projectile mass, type of projectile, charge, etc.) and a specific barrel for a specific zero range, the lead mark is usually adjustable for elevation and deflection in known manner by means of an adjusting mechanism.

In addition, different construction designs have been disclosed that make it possible to index the adjusted position by means of an index mark (zeroing).

With such designs, however, it is usually only possible to index one specific setting, ie only one zero mark, for the point of impact for specific ballistics using a specific barrel for just one shooting range.

An actuator of the type described at the outset for use on a telescopic sight and enabling multiple zeroing, ie zeroing for a number of ranges and/or for different ballistics and/or different gun barrels etc., is disclosed, for example, by Leatherwood (USA) under the name of "Uni-Dial" (see also US 2004/0144013 A1). This actuator exhibits a number of indicator flags that can be rotated in the actuator. The actuator is embodied in the form of a rotary knob that consists of several disk-shaped elements positioned around the axis of rotation of the unit. The flags are disposed on flat disks located between the disk-shaped elements of the rotary knob (turret) (in the disclosed embodiment the disk-shaped elements of the rotary knob are substantially thicker than the disks having the flags) and are displaceable in an adjustment mode of the actuator, ie the disks on which the flags are located can be rotated about the axis of rotation without the lead mark itself being displaced.

In the operating mode, after zeroing for different shooting ranges, barrels, etc., the flags are fixed in their adjusted position by screwing, or otherwise fixing, the rotary knob (ie the plates that form the rotary knob) such that the said plates are pressed tightly against each other so that the flag indicator plates are squeezed between the disks of the rotary knob and are entrained with the knob when the latter is rotated.

The disadvantage of this system, however, is that in order to adjust the individual flags, the rotary knob must be "loosened", ie its clamping action must be released such that the turret plates become slightly displaceable along the axis of rotation and the flags, or rather the plates carrying the flags, become rotatable. However, for this purpose, the tower must be slackened in a separate procedure, on the one hand, and, on the other hand, this leads—in a particularly detrimental manner—to all flags becoming loose so that flags that have already been adjusted can be easily accidentally moved from their settings.

BRIEF SUMMARY OF THE INVENTION

The present invention improves an actuator of the type defined at the outset to achieve that
 it is generally simple to operate with respect to multiple indexing and
 it allows for stable positioning of indexing elements that have already been set, even if the indexing procedure has not yet been terminated or renewed indexing is carried out for one or more other indexing elements.

This is achieved on an actuator of the type defined at the outset in that, according to the invention, the outer surface(s) of the indexing element(s) is/are offset from the lateral surface of the rotary knob toward the axis or rotation of the rotary knob and said indexing element(s) is/are permanently rotatable in the recess(es).

In an actuator of the invention, the indexing elements can be moved independently of each other, since loosening of the turret is not necessary and the indexing elements are disposed separately from each other in their own recesses. Unintentional displacement of an index mark during the zeroing procedure or when using the firearm can therefore be easily prevented, because the outer surface of the indexing element is offset from the lateral surface of the knob in the direction of the axis of rotation of the rotary knob.

With the invention, a so-called "indexing mode", in which the index marks are displaceable as in the aforementioned prior art, no longer exists, but rather the indexing elements are, in principle, adjustable at any time by means of the special embodiment of the invention. Any unintentional simultaneous displacement of the indexing elements is not, or only hardly, possible.

In principle, the invention is also realizable and meaningful with only one indexing element. The use of a number of indexing elements does, however, have a special advantage, since this makes it possible for the user to index different shooting ranges and/or different ballistic situations and/or different barrels or exchangeable barrels using the same telescopic sight, as required.

Neither is it necessary, in principle, to have at least one indexing element in each recess. However, it is a sensible and convenient arrangement to have at least one indexing element in each recess, since this provides a large number of adjustment possibilities, depending on the number of recesses.

If the indexing elements are coupled to the rotary element in the recesses by means of friction-type clutches, the indexing elements can be adjusted easily and with minimum effort. In a specific embodiment, coupling is effected by means of a friction connection, in which case the indexing elements can be easily rotated by exerting force on the adjustment knob (while the rotary knob is held firmly by the user). When the rotary knob is itself turned, however, there occurs no adjustment of the indexing elements. No additional mechanical elements, such as screws etc., are necessary for locking the indexing elements when coupling is effected via friction means, which means that adjustments are easier to carry out and the actuator is simpler and more economical to manufacture.

Unwanted adjustment of the position of an indexing element when adjusting another indexing element is then optimally prevented when just one indexing element is present in each recess.

If the one or more recesses each form a closed ring on the lateral surface, a particularly large adjustment range for the individual indexing element is created.

An optimal fit and hold as well as an easy, unhindered adjustment of the indexing elements are possible if an indexing element is formed in the form of a ring section or a closed ring.

In particular, if an indexing element is designed in the form of a closed ring, it is necessary that it exhibits a mark, which is brought into register with a fixed "zero mark", if, for example, the desired appropriate distance for the lead mark is to be adjusted. In this context it is advantageous when an indexing element exhibits at least one depression.

This depression serves, on the one hand, as a mark, by means of which the indexed position can be indicated, and, on the other hand, it provides a simple and easy way of rotating the indexing element, since a pointed article, perhaps a ballpoint pen, can be pushed into this depression and the element therein can be relatively easily rotated against the force exerted by the rotary knob.

Theoretically, an indexing element can be provided with a number of depressions, but for exact and unambiguous indexing it is advantageous if each indexing element has only one depression.

In actuators in the type defined at the outset, provision is frequently made for a specific adjustment range of the lead mark is given in which the lead mark can be adjusted in the operating mode. This adjustment range is limited by at least one operating range limit stop. Either two separate operating range limit stops are provided that restrict the rotary motion of the rotary knob, or only one operating range limit stop serves as both the upper and lower stop, while, depending on the dimensions of the operating range limit stop device, a turn of almost 360° is possible, typically approx. 330°. The limitation of the overall range of possible adjustment to one adjustment range serves to avoid indexing ambiguities.

Actuators have also been disclosed in which the adjustment range is not restricted by means of operating range limit stops. To enable a user to know at what position the rotary knob is set, ie how many turns the rotary knob has made starting from an initial setting, horizontal bars are provided which are either hidden or made visible as the rotary knob is turned.

Such a system makes an additional adjustment range of the lead mark possible. Such a system is of particular interest to the military. Since in such systems the individual index marks are defined by vertical bars and thus a large number of adjustments is possible, the user of such a rifle needs, for use, lists in which the individual index marks are defined, particularly in connection with the number of full turns of the rotary knob.

Such a high degree of accuracy is not necessary in hunting, and the shooting ranges encountered in hunting are restricted to a significantly narrower range than that required by the military.

On the other hand, in hunting it is necessary that the lead mark of a sight of a rifle can be indexed simply and quickly and without the use of said lists, eg for four different ranges, and that such ranges can be quickly and simply set by the user. For this reason, in hunting, actuators for telescopic sights are mainly used that have an operating range limit stop as is the case on the aforementioned telescopic sight sold by Leatherwood.

With this telescopic sight, the operating range limit stop is defined by a screw that can be loosened. By loosening and turning the screw along the periphery of the actuator, the stopping point and thus the adjustment range of the lead mark can be adjusted in relation to the entire possible adjustment range.

This solution, however, has some drawbacks in practice. The procedure of loosening, turning, and subsequently tightening the screw is relatively complicated. There is a risk of losing the screw. In addition, the system can become contaminated with dirt relatively easily, which might lead to deterioration of the adjustability.

In order to further overcome these drawbacks in an actuator of the type defined at the outset, provision is made in that the turning range of the rotary knob is delimited by at least one operating range limit stop in both directions of rotation and that the rotary knob is releasably attached to the adjusting mechanism, at least one operating range limit stop is capable of being deactivated such that the rotary knob can be turned in both directions beyond the operating range limit stop, and the actuator can be switched between at least three different modes of operation, viz:

a) in mode A the rotary knob is coupled to the adjusting mechanism and the operating range limit stop is inactive, b) in mode B the rotary knob is decoupled from the adjusting mechanism and the operating range limit stop is activated, and c) in mode C the rotary knob is coupled to the adjusting mechanism and the operating range limit stop is activated.

Due to the disconnectable coupling of the turret to the adjusting mechanism, the entire mechanics for activating and deactivating the limit stop can be integrated in the turret while maintaining full adjustability. In this way, contamination is prevented and no components can be lost. Adjustment and operation of the telescopic sight is made substantially easier due to the ability to set the actuator to different modes, with two of these serving to set up the basic settings and the third representing the actual "operating mode" in which the lead mark is brought into a position that corresponds to a particular shooting range by turning the rotary knob.

In a specific, advantageous embodiment, a limit stop element is placed inside the rotary knob, which butts against an operating range limit stop when it is turned in a first, lower position, so that the operating range limit stop is active, and which moves beyond the limit stop element when it is turned in a second, upper position, so that the operating range limit stop is deactivated. Due to the fact that the entire stopping mechanism is inside the rotary knob or actuator, the aforementioned advantages are realized and the disadvantages discussed above are avoided.

The subject matter of the invention can be realized and assembled particularly easily if the stopping element is a pin which can be displaced in a direction parallel to the axis of rotation.

For coupling and decoupling the rotary knob to and from the adjusting mechanism, the rotary knob is connected to a first coupler element that is adapted to engage a second coupler element that is connected to the adjusting mechanism, so that turning the rotary knob entrains the adjusting mechanism, the first and second clutch systems being detachable from each other.

In a specific embodiment, the stopping element and the first coupler element are separate entities, this being the simplest variant from the point of view of manufacturing technology and design engineering.

The limit stop element and the first coupler element could alternatively be designed as a single unit to the effect that, for instance, the limit stop element is mounted for vertical displacement in the first coupler element in the form of a pin. This is an elegant variant which saves space inside the rotary knob, but it is more complicated as regards kinematics and manufacturing.

In principle, however, the limit stop element and the first coupler element could indeed be made as a single unit.

A simple embodiment that makes a reliable and readily deactivated coupler possible and that, in addition, has a multiplicity of possible coupler positions between the rotary knob and the adjusting mechanism, is realized when the second coupler element comprises one or more orifices or projections that is/are positioned at the periphery of the adjusting mechanism and when the first coupler element is a projection or orifice respectively, whilst in the coupled state a projection engages an orifice.

Alternatively, the first and second coupler elements can form a friction clutch, for example in that the first coupler element is a projection with a rubber lug that engages a rubber band disposed around the adjusting mechanism in its peripheral direction.

Simple engagement or disengagement of the clutch can be realized if the first or second coupler element can be displaced in a direction parallel to the axis of rotation for disengagement of the clutch.

For example, the second coupler element could be pushed downwardly against the force of a spring.

A particularly simple, ergonomic, and dirt-insensitive method of adjustment is realized when a control element that can be rotated about the axis of rotation of the rotary knob is disposed inside the rotary knob and at least one operating cam moves round the periphery thereof, which cam cooperates with the limit stop element and the first coupler element, the at least one operating cam exhibiting a continuous path that features a rising or falling course in certain regions of the periphery.

In the case of a limit stop element which is separate from the first coupler element, it is sufficient to have just one operating cam on the control element which, for instance, lifts the first coupler element from the second coupler element when it is turned through its particular path, while the limit stop remains active, etc.

If the two elements can be interleaved, as described above, and thus be disposed one directly above the other, a separate operating cam is necessary for each element (limit stop element and first coupler element).

The control element can be fixed relatively to the rotary knob to prevent the control element from being rotated unintentionally to activate another mode when the rotary knob is turned.

The said effect can be realized in an even simpler manner with the same results, if the control element is coupled to the rotary knob by means of a friction clutch or a power clutch. In the case of a frictional connection between the rotary knob and the control element, rotation of the control element by applying appropriate force thereto while simultaneously gripping the rotary knob is sufficient to activate another mode. If, however, the rotary knob is rotated, the control element is simply entrained by the friction forces between the rotary knob and the control element.

The control element is itself conveniently mounted for rotation in the rotary knob, and the top cover face of the control element is substantially flush with the cover face of the rotary knob.

In order to enable simple rotation of the control element and thus activate the various modes, the control element exhibits one or more orifices on its top surface for the accommodation of a key, and by way of the key the control element can be turned relatively to the rotary knob.

When a friction clutch is disposed between the control element and the rotary knob, this key simply serves to make it easier to turn the control element in the rotary knob but does not have any key "function" in the sense of something being "locked".

However, any means for fixing the position of the control element relatively to the rotary knob can be disengaged and re-engaged with the key if such mechanical fixating means are provided. In the case of disengaged fixation, the control element can simply be rotated with the key.

In order to indicate the position of the lead mark in relation to the entire range, the adjusting mechanism exhibits a displacement indicator in its upper region which is moved up or down by rotating the adjusting mechanism in a direction parallel to the axis of rotation in an appropriate opening in the control element, which indicator, depending on position, is either flush with, projects above, or is positioned below, the cover surface of the rotary knob and/or the cover surface of the control element.

This displacement indicator can be in the form of an attachment to the adjusting mechanism, for example, or the said indicator and the adjusting mechanism can alternatively be made as a single unit. The displacement indicator is raised or lowered appropriately by means of the up and down movements of the adjusting mechanism, ie the spindle. If the displacement indicator is already very far inside or outside the actuator following assembly and an initial set-up of the telescopic sight, this points to poor assemblage, which can result in the adjustment range no longer being fully exploited.

BRIEF DESCRIPTION OF THE DRAWINGS

The invention is described below in more detail with reference to the drawings, in which.

DETAILED DESCRIPTION OF THE INVENTION

The Figures illustrate an actuator BET of the invention. This consists, as can be seen in particular in FIGS. 1-4, in known manner, of, for instance, a rotary knob DRE that, when turned about its axis of rotation ACH, adjusts a reticle (lead mark) by means of the adjusting mechanism STE not illustrated in detail, which comprises, for example, a spindle. Depending on the arrangement of the actuator BET, this rotating motion results in an adjustment of the lead mark in a vertical or horizontal direction, or, if desired, in both horizontal and vertical directions. It is to be noted, however, that usually a separate actuator is used for adjustments in the horizontal direction and another one for adjustments in the vertical direction.

The rotary knob DRE usually consists, as illustrated, of a cylindrical housing, which, according to the invention, exhibits one or more recesses AS1, AS2, AS3, AS4 in its lateral surface MAN, into which recesses indexing elements IN1, IN2, IN3, IN4 are inserted. The indexing elements IN1-IN4 can be rotated in the peripheral direction in these recesses AS1-AS4.

In principle, to accommodate, for example, a number of indexing elements in an actuator of limited height, several indexing elements can be accommodated in one recess. For instance, with two indexing elements per recess, 8 indexing elements and thus 8 adjustment options would be created.

It is particularly advantageous, however, if just one indexing element is disposed in each recess, as shown, since in this case there is absolutely no likelihood of unintentional displacement of one or more other indexing elements not only when turning the rotary knob but also when one of the indexing elements is intentionally adjusted.

The actuator BET is particularly stable when the recesses AS1-AS4 are annular depressions in the lateral surface MAN of the rotary knob DER, as shown, in which the indexing elements IN1-IN4, which are also in the form of appropriately matching rings, are disposed.

The indexing elements do not necessarily have to be in the form of rings. For example, the indexing elements might well be small, block-like elements of minimal spread in the peripheral direction and displaceably disposed in the recesses. The use of such elements has the advantage of lower material costs and the creation of an indexing element which itself serves as a mark, whereas an indexing ring as shown in the drawings needs its own, additional mark, as explained below in more detail.

The use of indexing rings, however, has the advantage of simpler adjustability, since tilting, such as can occur with a block shaped element, is not possible, and furthermore the advantage of preventing dirt from ingress into the recesses AS1-AS4, so that long-term optimal operability is assured.

In addition, ring shaped indexing elements are advantageous because they automatically stay in the recesses due to their shape (at least when the ring covers more than a semicircle), while measures must be taken with block shaped elements to ensure that they do not fall out of the recesses.

The indexing elements IN1-IN4 are entrained, preferably by friction, in the recesses ASI-AS4 as the rotary knob DRE is turned.

In the embodiment shown, in which the indexing elements are entrained by the rotary knob DRE by means of friction, it is only necessary to exert an appropriate, independent force on the respective indexing element to effect adjustment of the indexing elements IN1-IN4 relative to the rotary knob DRE.

This has the advantage, over the prior art, that the rotary knob DRE does not have to be loosened, and that due to the disposition of the indexing elements in separate recesses AN1-AN4, each indexing element can be simply and separately adjusted without the risk of the other indexing elements being inadvertently displaced.

It is naturally conceivable for each indexing element to be fastened by separate fastening means, for example by means of a screw, in the rotary knob DRE, and to be releasable for rotation. This provides a variant which is absolutely secure against unintentional displacement. In relation to the prior art, this embodiment exhibits the advantage that not all indexing elements have to be loosened for adjustment of one indexing element, but only the indexing element concerned. A disadvantage, however, is that something does have to be loosened, and in practice it has been found to be entirely sufficient for the avoidance of unintentional rotation of indexing elements (whether by turning the rotary knob or by adjusting an indexing element) to cause the indexing elements to be entrained by friction on rotation of the knob DRE.

In the advantageous embodiment shown, the recesses AN1-AN4 are designed in such a way that the indexing elements IN1-IN4 are slightly offset to the rear relative to the lateral surface MAN of the rotary knob DRE. This has the consequence that there is no risk of a force being unintentionally exerted on the indexing elements when the rotary knob DRE is turned such as could result when rotating the indexing elements.

Furthermore, the lateral surface exhibits fluting in the regions between the recesses to make the actuator easier to use.

In the embodiment shown, the actuator BET exhibits four indexing elements by means of which, for example, a rifle can be zeroed for four different shooting ranges, as mentioned at the outset. Depending on the shooting range, the marksman will move the appropriate mark of an indexing element IN1-IN4 or the appropriate indexing element itself with its mark MAK which is fixed in relation to the rifle, the so-called "zero-mark", into position. This mark MAK is positioned on a fixed base SOC of the actuator BET or directly on the housing of the telescopic sight ZEF (see eg FIG. 7).

Figure 1:
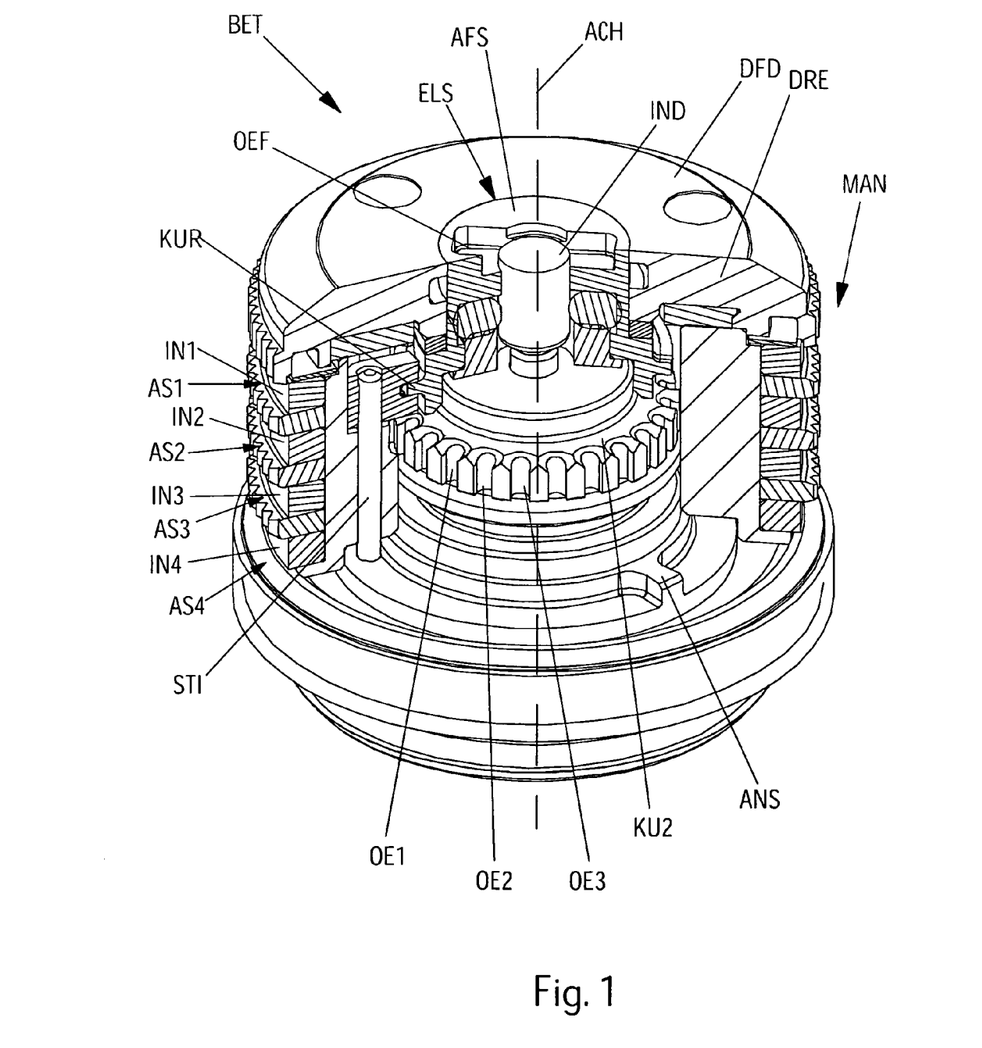
FIG. 1 shows an actuator according to the invention in a perspective cutaway view.
Figure 2:
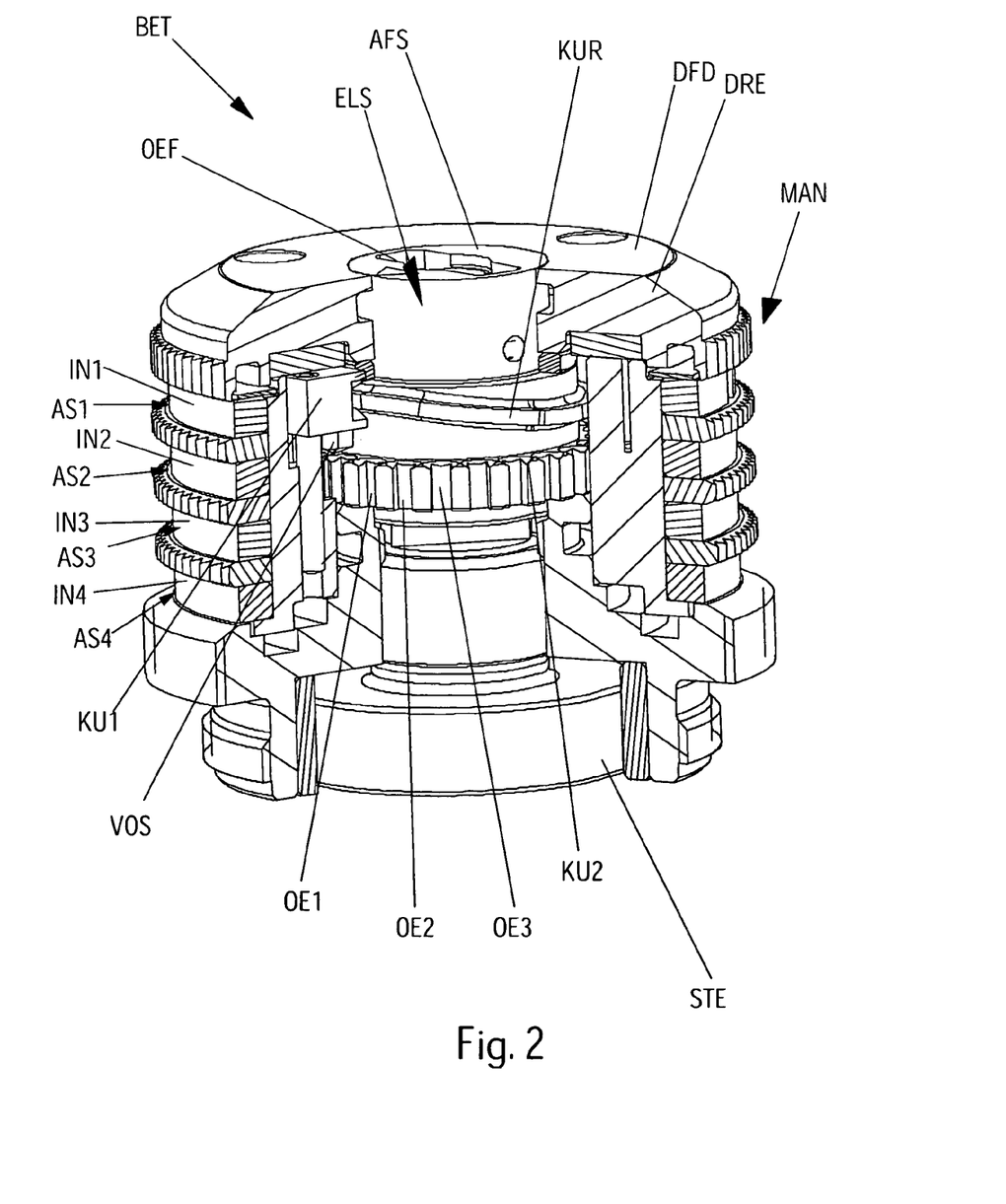
FIG. 2 shows the actuator of FIG. 1 in another cutaway section.
Figure 3:
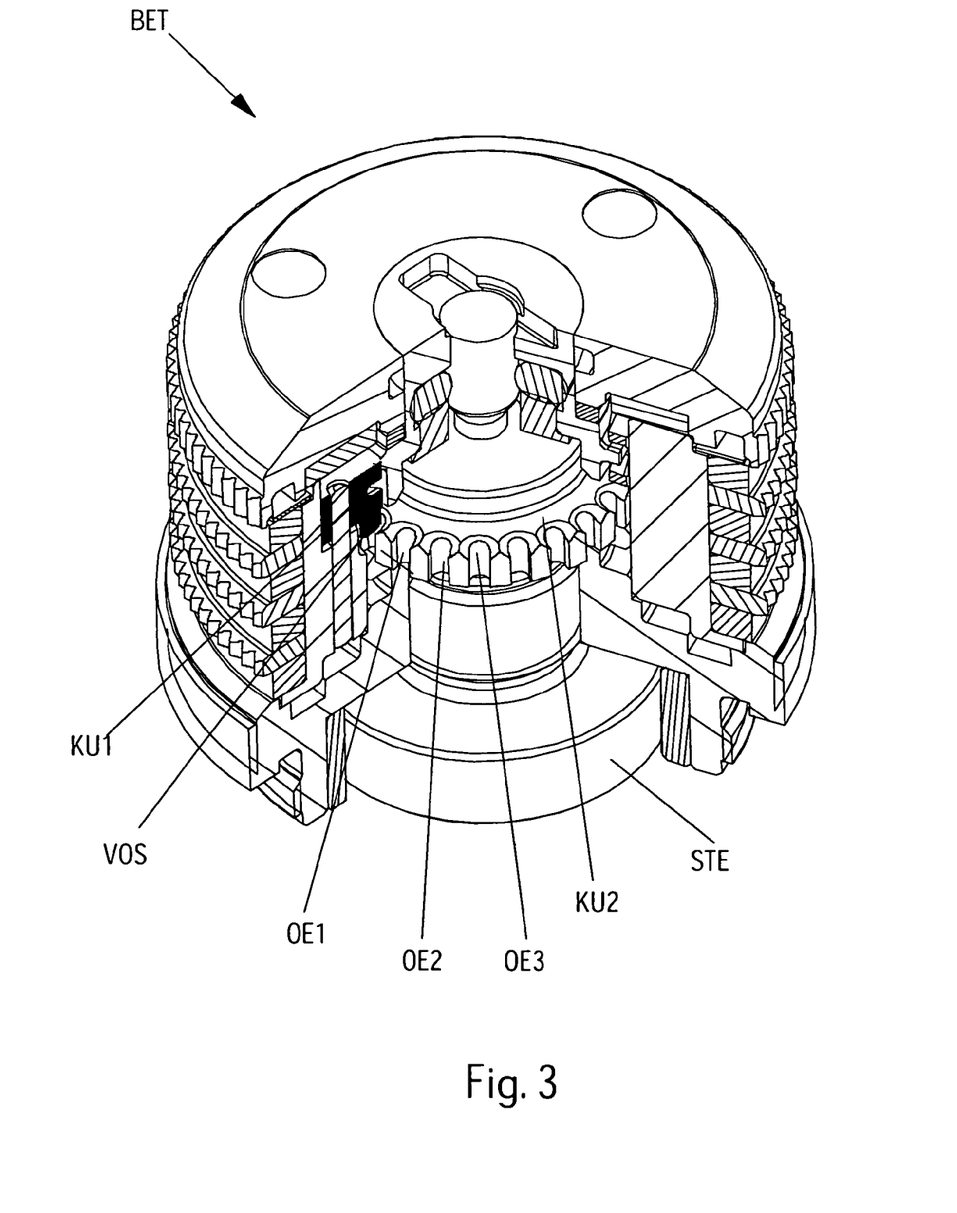
FIG. 3 shows a further section of the actuator in a perspective view.
Figure 4:
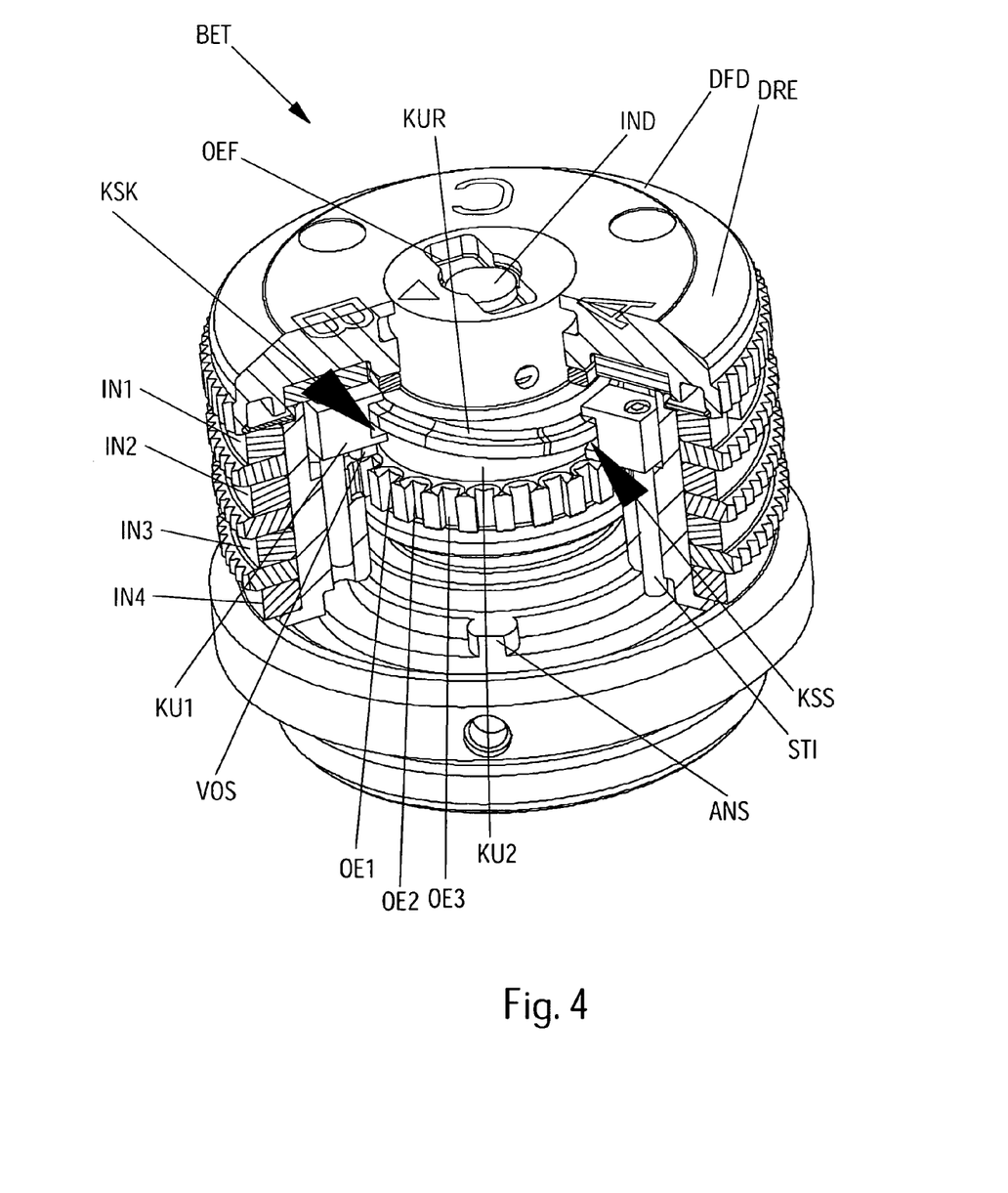
FIG. 4 shows yet another section.
Figure 6:
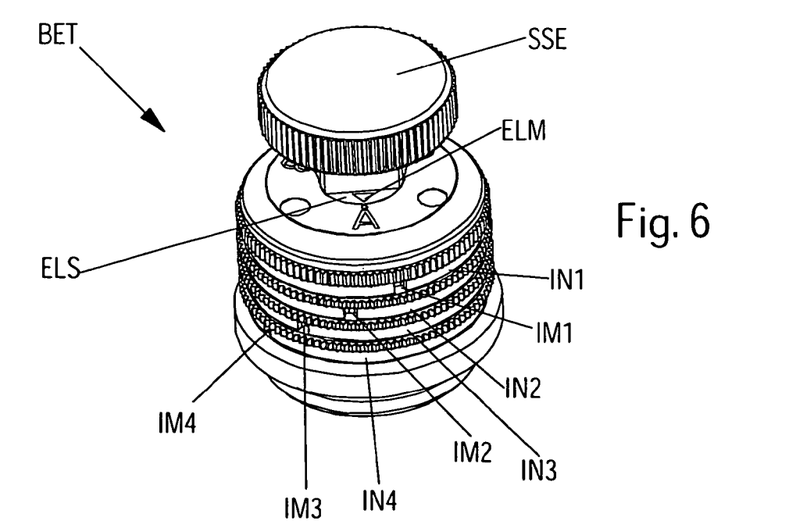

Reference is made, by way of example, to FIG. 4 showing four indexing rings IN1-IN4, which in each case exhibit a mark IM1-IM4 (FIG. 6). The mark IM1 of the top ring IN1 identifies, for example, a zero for 50 m, the mark IM2 of the second ring N2 for 100 m, the mark IM3 of the third ring IN3 for 150 m and the mark IM4 of the fourth ring IN4 for 200 m. If the marksman intends to shoot at a target at a range of 150 m, he will rotate the rotary knob DRE until the mark IM3 of the third indexing ring IN3 is in line with, ie opposite, the mark MAK.

The other marks or a point between two marks are selected for different distances, (for instance for 80 m, a position of the rotary knob DRE is selected at which the mark MAK lies between the marks IM1 and IM2).

Again, it is emphasized that this rotation of the rotary knob DRE to the position of the indexing elements IN1-IN4 has no effect on the rotary knob itself. The indexing elements themselves are only adjusted when zeroing, in which case force must be explicitly exerted on the same without the necessity, with this variant, of having to tighten or loosen the actuator.

As previously mentioned, it is necessary, when using indexing elements that extend over the entire periphery, for the indexing element itself to exhibit a mark which can be moved to be in line with the fixed mark on the telescopic sight by rotating the rotary knob DRE.

In the embodiment shown, this mark is a depression IM1-IM4 in the respective indexing element IN1-IN4. This embodiment has the advantage that, apart from the marking function by means of the depression, an indexing element can be particularly easily rotated, since one can insert a sharp object such as a pencil, ballpoint pen etc. into the depression and readily adjust the indexing element. In this case the (friction) force between the rotary knob and the indexing elements in the depressions can be relatively large so that it is no longer possible to effect (unintentional) rotation without the aid of a tool such as a pencil etc.

The invention is naturally particularly suitable, as explained above, for zeroing for a number of shooting ranges, for different ballistics, exchangeable barrels, etc. In principle, the invention is also suitable for zeroing a rifle barrel, for example, for just one range. In this case, it will naturally have only one indexing element.

In the context of the relationships described above the following may be noted:

The actuator can be used with one or more indexing elements.

A number of indexing elements can be disposed in one recess, but it is an advantage to use only one indexing element per recess.

Each indexing element can be tightened and loosened in a recess by means of fastening means (eg screws). This is particularly advantageous when using a number of indexing elements per recess.

As shown above, however, an embodiment in which the indexing elements are entrained by a friction connection is simpler and better.

For n indexing elements there are n+1 indexing options, since one operating range limit stop of the rotary knob can also be used as an index mark.

As can be discerned from FIGS. 1-4, the turning range of the rotary knob DRE is limited by an operating range limit stop ANS in both directions of rotation. The rotary knob DRE is detachably coupled to the adjusting mechanism STE, and the at least one operating range limit stop ANS can be deactivated so that the rotary knob DRE can be rotated in both directions beyond the operating range limit stop ANS. Furthermore, the actuator BET can be switched between three different modes, and a) in mode A the rotary knob DRE is coupled to the adjusting mechanism STE and the operating range limit stop ANS is inactive, b) in mode B the rotary knob DRE is decoupled from the adjusting mechanism STE and the operating range limit stop ANS is active, and c) in mode C the rotary knob DRE is coupled to the adjusting mechanism STE and the operating range limit stop ANS is active.

Because of the detachable coupling of the rotary turret DRE to the adjusting mechanism STE, the entire mechanism for activating and deactivating the limit stop ANS can be integrated into the rotary knob whilst preserving full adjustability. Contamination is thereby prevented and no components can be lost. The possibility of setting the actuator to different modes, with two of these serving to establish the basic settings and the third representing the actual "operating mode" in which the lead mark is brought into a position corresponding to a certain shooting range by rotation of the rotary knob, adjustment and operation of the telescopic sight become much easier.

In one specific and advantageous embodiment, a limit stop element STI is positioned inside the rotary knob DRE, which, when the rotary knob DRE is turned, butts against the operating range limit stop ANS in a first, lower position, so that the operating range limit stop ANS is active, whilst in a second, upper position the limit stop element STI glides over the operating range limit stop ANS when turned, so that the operating range limit stop ANS is deactivated. Due to the fact that the entire stopping mechanism is disposed inside the rotary knob or actuator, the aforementioned advantages are achieved, that is to say, the disadvantages discussed above are avoided.

The invention can be realized and its subject assembled particularly easily if the limit stop element STI is a pin STI that is displaceable in a direction parallel to the axis of rotation ACH of the rotary knob DRE.

For coupling and decoupling the rotary knob to and from the adjusting mechanism, the rotary knob DRE is connected to a first coupler element KU1, which engages a second coupler element KU2, which is connected to the adjusting mechanism STE, so that when the rotary knob DRE is turned, the adjusting mechanism STE is entrained, and the first and second coupler elements KU1, KU2 can be disconnected from each other.

In a specific embodiment, the limit stop element and the first coupler element are separate entities, this being the simplest variant from the point of view of manufacturing technology and design engineering.

However, the limit stop element and the first coupler element could alternatively be built "as a single unit" such that, for instance, the limit stop element is mounted for vertical displacement in the form of a pin in the first coupling element. This represents an elegant variant which saves space inside the rotary knob, but it is more complicated as regards kinematics and with respect to production.

In principle, however, the limit stop element and the first coupler element might indeed be made as a single unit.

A simple embodiment ensuring readily disconnectable coupling and making available, in addition, a number of possible coupling positions between the rotary knob and the adjusting mechanism is realized if, as shown, the second coupler element KU2 contains one or more orifices OE1, OE2, OE3 . . . , which are disposed on the periphery of the adjusting mechanism STE, and the first coupler element KU1 is or has a projection VOS and the projection VOS engages an orifice OE1, OE2, OE3 in the coupled condition.

Another option is that the first and second coupler elements form a friction clutch, for example in that the first coupler element is a projection having a rubber lug that engages a rubber band disposed around the adjusting mechanism in the peripheral direction.

Simple deactivation or activation of the clutch can be realized when the first or second coupler element KU1, KU2 is adjustable in a direction parallel to the axis of rotation ACH for deactivation of the clutch.

For example, the second coupler element could be downwardly displaceable against the force of a spring.

In the embodiment shown, the second coupler element KU2 is rigidly connected to the adjusting mechanism STE. These can consist of two connected elements or alternatively be made as a single unit.

In the coupled condition, the rotating motion is transferred from the rotary knob DRE, in which the first coupler element KU1 can be moved up and down but not laterally in the peripheral direction, to the adjusting mechanism STE via the second coupler element KU2, which adjusts the lead mark. In the decoupled condition, the rotary motion is not transferred to the adjusting mechanism, since the first and second coupler elements do not engage one another so that the position of the lead mark remains unchanged when the rotary knob is turned.

A particularly simple, ergonomic and dirt-resistant adjustment system is realized when a rotatable control element ELS is disposed within the rotary knob DRE such that it can be rotated about the axis of rotation ACH relative to the rotary knob, and at the periphery of which, as shown, an operating cam KUR that interacts with the limit stop element STI, and the first coupler element KU1 runs so as to execute a continuous path that features a rising or falling path in certain regions of the periphery.

The operating cam KUR interacts with the limit stop element STI and the first coupler element KU1 because these elements STL, KU1 each exhibit an operating cam groove KSS (limit stop element STI) and KSK (first coupler element KU1), by means of which it engages the operating cam KUR. Both of these elements are mounted in the rotary knob for displacement in a direction parallel to the axis of rotation but lateral displacement in the peripheral direction is not possible. In the case of a fixed rotary knob, one of the two elements STI, KU1 is then moved up or down as the control element ELS is rotated by means of the cam and the other one remains in its vertical position. Alternatively, both elements may be moved, one upwardly, the other downwardly.

When the limit stop element and first coupler element are separate from each other, it is sufficient to have only one operating cam on the control element, which cam, when rotated through its specific path, for example lifts the first coupler element from the second coupler element while the limit stop remains active, etc.

If the two elements can be interleaved, as described above, and thus disposed one directly above the other, a separate operating cam is necessary for each element (limit stop element and first coupler element).

The position of the control element can be locked in relation to the rotary knob DRE so that the control element cannot be turned unintentionally so as to activate another mode when the rotary knob is turned.

The aforementioned effect can be achieved in an even simpler way and with the same result when, as shown, the control element ELS is coupled to the rotary knob DRE by means of friction. In the case of a frictional connection between the rotary knob and the control element, turning the control element with an appropriate application of force while simultaneously holding the rotary knob is sufficient to activate another mode. If on the other hand the rotary knob is rotated, the control element is simply entrained by the friction forces between the rotating knob and the control element.

The control element ELS itself is conveniently mounted in the rotary knob DRE for rotation, and the cover surface AFS of the control element ELS is substantially flush with the top surface DFD of the rotary knob DRE.

In order to make it possible to simply rotate the control element to activate the different modes, the control element ELS exhibits one or more orifices OEF in its top surface for the insertion of a key SSE, and by means of said key SSE the control element ELS can be rotated relatively to the rotary knob DRE.

In the case of a friction coupling between the control element and the rotary knob, as shown, this key has only the function of making it possible to turn the control element in the rotary knob more easily and it does not, however, have any sort of key "function" in the sense of something being "locked".

However, a fixed position of the control element relative to the rotary knob can be deactivated and re-activated by means of the key, if means for such mechanical position fixing are provided. In the case of deactivated position fixing, the control element can be simply turned by means of the key.

In order to show the position of the lead mark in relation to the entire adjustment range, the adjusting mechanism STE exhibits a displacement indicator element IND in its upper region that is moved up or down in an appropriate opening in the control element ELS when the adjusting mechanism STE is rotated about an axis parallel to the axis of rotation ACH and, depending on its position, the top surface of said element IND is positioned above, or flush with, or below the cover surface DFD of the rotary knob DRE or the cover surface AFS of the control element ELS.

This displacement indicator element IND is, for example, in the form of an attachment to the adjusting mechanism STE, although the indicator element and the adjusting mechanism may be embodied as a single unit, if desired. The displacement indicator element is raised or lowered accordingly by the up and down movements of the adjusting mechanism, ie the spindle. If the displacement indicator element is in a position very far in or out of the actuator following assembly and initial zeroing of the telescopic sight, this points to poor assembly, which can have the result that the adjustment range can no longer be exploited entirely.

Figure 5:
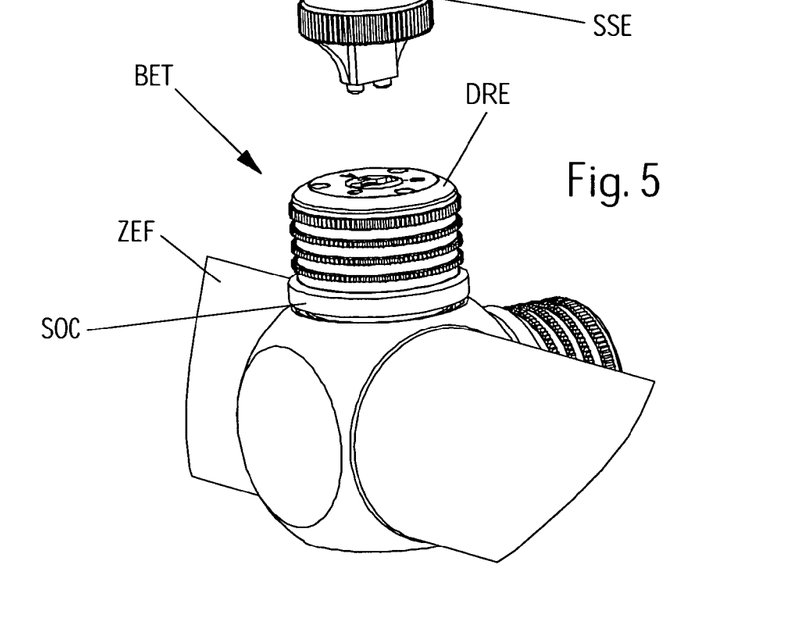
FIGS. 5 to 11 show different settings of the actuator for activating different modes of the actuator.

FIG. 5 shows yet another actuator BET of the described type having a key SSE on a telescopic sight ZEF. The rotary knob DRE is in this case mounted on a base SOC that is fixed relative to the telescope.

Although the invention is illustrated and described herein with reference to specific embodiments, the invention is not intended to be limited to the details shown. Rather, various modifications may be made in the details within the scope and range of equivalents of the claims and without departing from the invention.

In the following, FIGS. 6 to 11 show by way of example a step by step repeated procedure of zeroing the actuator for different shooting ranges in diagrammatic representation.

In a similar way, it is possible to effect deflective adjustments and/or, for example, multiple zeroing for various ballistics, exchangeable barrels, windage corrections, etc.

The mechanics in the vertical adjustment turret illustrated correspond to those in the horizontal adjustment turret.

Figure 12:
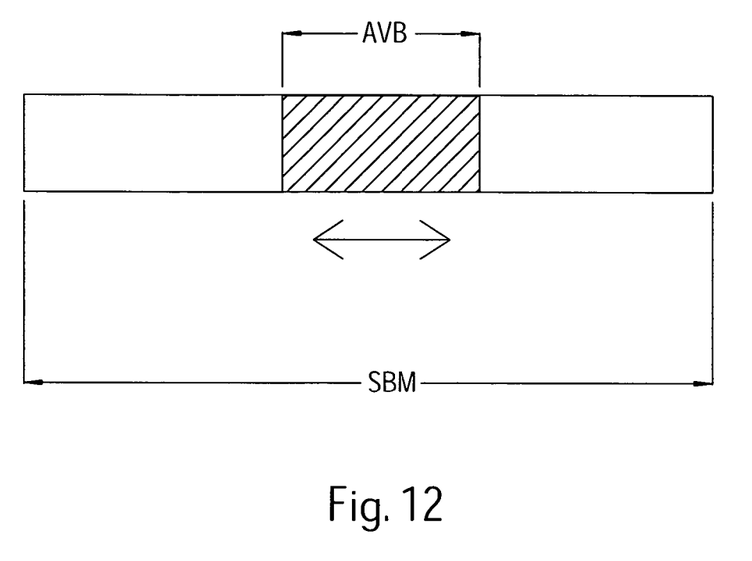
FIG. 12 shows diagrammatically the adjustment range of a telescopic sight.

FIG. 6: Using the key SSE, the control element ELS (the "mode dial") is turned to position A. The mode mark ELM points to A. In mode A, the rotary knob ("adjusting knob") adjusts the lead mark over the entire adjustment range, cf. FIG. 12. The selectable stop ANS is inactive.

The user now selects a minimum shooting range, for example, 100 meters and sets the lead mark exactly over the point of impact that is attained at 100 meters by rotating the adjustment turret accordingly.

Figure 7:
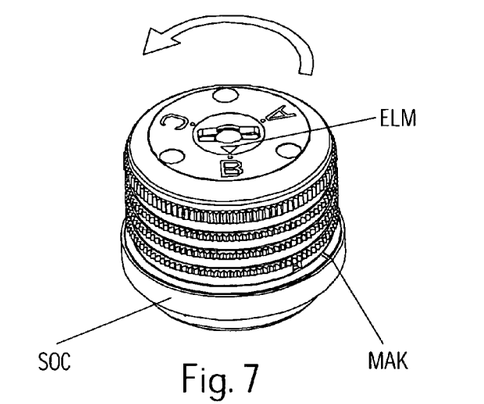

FIG. 7: Using the key SSE, the mode dial ELS is turned to position B. The mode mark ELM points to B. In mode B, the rotary knob of the adjusting mechanism STE is decoupled. The selectable stop ANS is active.

The user now rotates the adjustment turret anticlockwise as far as the limit stop (left-hand stop). This limit stop now corresponds to the (lower) operating range limit stop, defined by the operating range limit stop device ANS (in the specific embodiment, the operating range limit stop device ANS defines both the lower and the upper operating range limit stops, ie the entire adjustment range), so that the adjustment range AVB is established in relation to the entire adjustment range SBM (cf. FIG. 12).

The lower operating range limit stop now corresponds exactly to the main index mark and now indexes zeroing for 100 meters.

Figure 8:
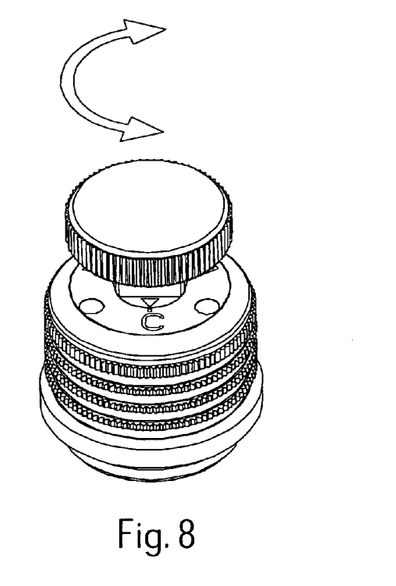

FIG. 8: Using the key SSE, the mode dial ELS is turned to C. The mode mark ELM points to C. In mode C the rotary knob adjusts the lead mark from the selected left-hand stop within a full turn in the clockwise direction. The operating range limit stop and the adjusting mechanism are thus active.

Figure 9:
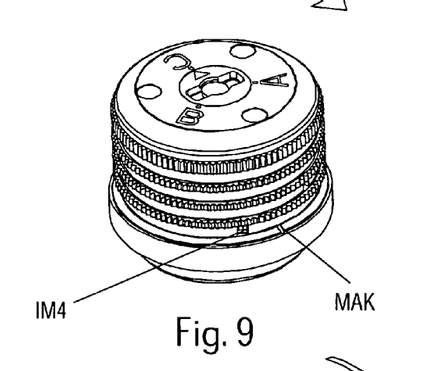

FIG. 9: The user now selects another shooting range, for example, 200 meters and adjusts the lead mark to exactly the point of impact that is attained at 200 meters by rotating the rotary knob in the clockwise direction.

Figure 10:
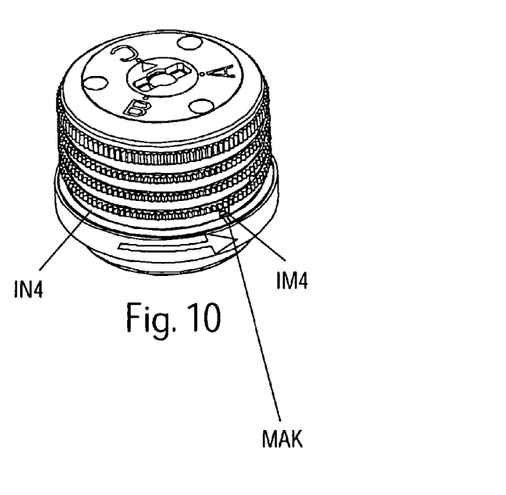
Figure 11:
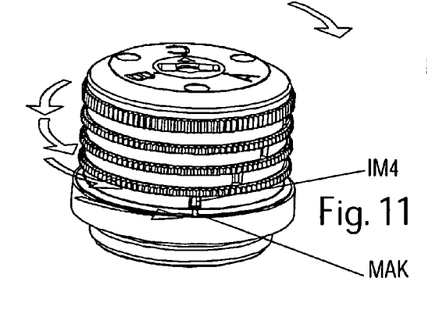

FIG. 10: The user now pushes one of the individually variable indexing elements to a position opposite the main index mark ("zero-mark") MAK. The selected index mark now indexes zeroing for 200 meters.

The invention claimed is:

1. An actuator for adjusting a lead mark of a telescopic sight, wherein said actuator is in the form of a rotary knob mounted for rotation on said telescopic sight and, when said rotary knob is turned, the position of the lead mark displaced via an adjusting mechanism in the vertical and/or horizontal direction, and said rotary knob has one or more indexing elements, by means of which one or more positions of the lead mark can be indexed, and when said rotary knob is turned in an actuating mode the one or more indexing elements are entrained with said rotary knob and in an indexing mode the indexing elements are displaced, independently of said rotary knob, in a peripheral direction of said rotary knob, which rotary knob has one or more recesses in the peripheral direction at its lateral surface, wherein, in at least one recess there is mounted at least one indexing element for rotation in the peripheral direction, said one or more indexing elements being coupled in their recesses to said rotary knob in such a manner that they are entrained with said rotary knob when the latter is turned, wherein the external surface of said one or more indexing elements is offset from the lateral surface of said rotary knob in the direction of the axis of rotation of said rotary knob and said one or more indexing elements are permanently disposed and displaceable in said recesses.

2. An actuator as defined in claim 1, wherein in each recess there is disposed at least one indexing element.

3. An actuator as defined in claim 1, wherein the indexing elements are coupled via a frictional connection or a friction lock to said rotary knob in said recesses.

4. An actuator as defined in claim 1, wherein in each recess there is disposed just one indexing element.

5. An actuator as defined in claim 1, wherein the one or more recesses each form a closed ring around the lateral surface.

6. An actuator as defined in claim 1, wherein an indexing element is in the form of a ring section or a closed ring.

7. An actuator as defined in claim 1, wherein an indexing element has at least one depression.

8. A telescopic sight having an actuator as defined in claim 1.

* * * * *